United States Patent [19]

Lightsey

[11] Patent Number: 5,770,660
[45] Date of Patent: Jun. 23, 1998

[54] CONTINUOUS POLYMERIZATION PROCESS FOR PRODUCING NBR RUBBER HAVING A HIGH BOUND CONTENT OF ACRYLONITRILE

[76] Inventor: John W. Lightsey, 647 Barrosa Way, Baton Rouge, La. 70808

[21] Appl. No.: 429,830

[22] Filed: Apr. 27, 1995

Related U.S. Application Data

[63] Continuation of Ser. No. 242,807, May 16, 1994, abandoned, which is a continuation of Ser. No. 72,249, Jun. 4, 1993, abandoned, which is a continuation of Ser. No. 918,921, Jul. 22, 1992, abandoned, which is a continuation of Ser. No. 730,028, Jul. 12, 1991, abandoned, which is a continuation of Ser. No. 441,284, Nov. 27, 1989, abandoned.

[51] Int. Cl.$^6$ .................................................. C08F 236/12
[52] U.S. Cl. ............................... 526/66; 526/338; 526/80
[58] Field of Search ................................ 526/66, 80, 338

[56] References Cited

U.S. PATENT DOCUMENTS

| | | | |
|---|---|---|---|
| 3,547,857 | 12/1970 | Murray | 526/66 |
| 4,022,957 | 5/1977 | Griffith | 526/338 |
| 4,255,567 | 3/1981 | Sugi et al. | 526/338 |
| 4,299,952 | 11/1981 | Pingel et al. | 526/338 |
| 4,480,078 | 10/1984 | Gujarathi et al. | 526/65 |

FOREIGN PATENT DOCUMENTS

| | | |
|---|---|---|
| 56-16502 | 12/1983 | Japan . |
| 601587 | 5/1948 | United Kingdom . |

OTHER PUBLICATIONS

Hawley's Condensed Chemical Dictionary, Eleventh Edition, Van Nostrand Reinhold, New York, p. 1146, 1987.

*The Condensed Chemical Dictionary,* Tenth Edition, Revised by Gessner G. Hawley, Van Nostrand Reinhold, New York, 1981, p. 918.

*Primary Examiner*—Mark Nagumo

[57] ABSTRACT

An improved continuous process for the production of nitrile butadiene rubber with high bound acrylonitrile is provided wherein incremental amounts of butadiene monomer are continuously added in each of a plurality of reaction vessels to obtain a copolymer having superior environmental resistance and tensile strength properties.

12 Claims, No Drawings

CONTINUOUS POLYMERIZATION PROCESS FOR PRODUCING NBR RUBBER HAVING A HIGH BOUND CONTENT OF ACRYLONITRILE

This is a continuation of application Ser. No. 08/242,807 filed May 16, 1994, now abandoned, which is a continuation of application Ser. No. 08/072,249, filed Jun. 4, 1993, now abandoned, which is a continuation of application Ser. No. 07/918,921, filed Jul. 22, 1992, now abandoned, which is a continuation of application Ser. No. 07/730,028, filed Jul. 12, 1991, now abandoned, which is a continuation of application Ser. No. 07/441,284, filed Nov. 27, 1989, now abandoned.

The present invention relates to an improved continuous process for the free-radical, emulsion polymerization of acrylonitrile and butadiene monomers to produce copolymers having a high bound content of acrylonitrile. More particularly, this invention relates to an improved continuous polymerization process in which predetermined, incremental amounts of butadiene monomer are added at certain intervals in the polymerization process to produce nitrile butadiene rubber having improved properties.

BACKGROUND OF THE INVENTION

Nitrile butadiene rubber, also known as nitrile rubber or NBR, is a synthetic rubber produced through the copolymerization of acrylonitrile and butadiene monomers. The acrylonitrile component of NBR serves to provide a rubber which resists penetration, swelling and the environmental effects of fuels, oils and other non-polar materials. Thus, NBR having a high acrylonitrile content is often fabricated for use in oil well parts, fuel tank liners, fuel hoses, gaskets, oil seals and the like. Most commonly, the composition of NBR suitable for such applications is forty to fifty percent by weight acrylonitrile. NBR of this type is conventionally produced by batch, or continuous, emulsion polymerization processes.

Two factors, however, limit the maximum content of acrylonitrile in NBR to about fifty percent by weight. The first of these is the increased thermoplastic behavior of the copolymer as the acrylonitrile content increases, resulting in reduced processability of the polymer during coagulation, washing, drying and compounding. The second factor relates to the ability of acrylonitrile to polymerize in the presence of butadiene, since the reactivity ratio of butadiene is approximately ten times greater than that of acrylonitrile (r=0.3–0.4 for butadiene, r=0.02–0.04 for acrylonitrile). The near zero value for the reactivity ratio of acrylonitrile indicates that it will not homopolymerize effectively in the presence of butadiene.

Copolymerization of an azeotropic mixture of acrylonitrile and butadiene monomers is well-known in the art, and produces NBR having a medium acrylonitrile level as a result of the lower reactivity ratio of acrylonitrile monomer. To obtain acrylonitrile levels in the copolymer that are greater than levels found in the azeotropic mixture (37–42 percent acrylonitrile by weight, depending on temperature), disproportionately higher ratios of acrylonitrile monomer to butadiene monomer are required in the charge prior to polymerization. A summary of selected charges necessary to achieve specified acrylonitrile levels in the copolymer is found below in Table I.

TABLE I

| Acrylonitrile Monomer Charged (wt. pct.) | Butadiene Monomer Charged (wt. pct.) | Acrylonitrile Bound in Copolymer (wt. pct.) |
|---|---|---|
| 60 | 40 | 46 |
| 70 | 30 | 48 |
| 80 | 20 | 50 |
| 90 | 10 | 54 |
| 95 | 5 | 60 |
| 97 | 3 | 70 |
| 98 | 2 | 80 |

Conventional batch process copolymerization, as known in the art, typically involves charging predetermined amounts of the component monomers in a reaction vessel. The amounts of the monomers are determined empirically, depending upon the desired final copolymer composition. Such empirical determinations are presented in Table I above; detailed explanations regarding such empirical determinations can be found in *Rubber Chemistry & Technology*, Vol. 37, pp. 46–106 (1964), as well as other sources known in the art.

In addition to the monomers, an amount of water is added to the batch reactor, along with one or more emulsifying agents to form micelles with the monomer. Polymerization is then initiated through addition of known redox or peroxide initiators. Other reagents, including mercaptan and electrolytes may optionally be added to produce polymers having desirable properties such as reduced viscosity and the like. A latex containing the copolymer is thus obtained after polymerization.

Copolymers containing high bound acrylonitrile have undesirable properties when produced by a conventional batch process. In addition to the inherent problems of batch processing well known in the art, e.g., high process down time, high bound acrylonitrile copolymers have undesirable properties such as low monomer conversion, reduced reaction rates and inferior environmental resistance. These undesirable properties result from the large difference in reactivity of butadiene and acrylonitrile toward homopolyerization as indicated by the ten-fold difference in value between the reactivity ratios, above. For example, monomer conversion and ultimately reaction rate are reduced in a conventional batch reaction when the butadiene charge is reduced. The butadiene charge is intentionally reduced to increase the initial charge ratio of acrylonitrile/butadiene and increase the average bound acrylonitrile in the copolymer, Table I. Since the lesser charge of butadiene is consumed, part for part, at a nearly equivalent rate to the acrylonitrile charge, the butadiene charge is depleted first. As the butadiene charge is consumed, rapid copolymerization is replaced with very slow homopolymerization of acrylonitrile. Overall polymerization thus comes to a relative stop. The conversion at which useful copolymerization stops has a limit equal to about two times the weight, percent of the total butadiene charged.

Inferior strength and inferior environmental resistance properties result from the variation in monomor ratio that occurs as the lesser butadiene charge is consumed during polymerization. The change in monomer ratio during the course of a conventional batch process produces a continuously changing monomer distribution in the copolymer. This non-uniform monomer distribution in the copolymer degrades physical properties that rely on uniformity of structure such as tensile strength and solvent or gasoline permeability.

To overcome the problems associated with the conventional batch processing, it has been proposed that the total amount of butadiene required be divided into discrete increments with each increment being added at a predetermined interval, dependent upon the conversion of monomer to polymer. In such incremental addition batch processes, an initial amount of butadiene is charged which is less than the total amount of butadiene monomer necessary to achieve the desired conversion of acrylonitrile and butadiene to copolymer. The entire quantity of acrylonitrile monomer and other reagents are added with the initial charge of butadiene. The remaining amount of butadiene monomer is added in one or more increments, such that the quantity of butadiene monomer added in each of the increments is not larger than that amount necessary to achieve the desired acrylonitrile to butadiene ratio in the monomer mixture and in the final copolymer.

Copolymers produced by the above method have not shown the desired resistance to fuels, oils and other materials, nor have the desired strength properties been found in these copolymers. The properties of copolymers produced by two different batch processes are shown below, in Table V. Tensile strength for these copolymers was measured below 2000 psi, while swelling (volume change) resulting from immersion in fuels ranged from 16.1 percent to 40.5 percent, depending upon the batch method and fuel employed. Tensile strength reduction as a result of fuel immersion ranged from 28.3 percent to 51.8 percent.

Although the polymer characteristics just described are considered acceptable in the industry, NBR having superior tensile strength and environmental resistance properties is desired and needed. That is particularly true in view of the applications in which NBR is employed, which subject the fabricated rubber to stress and routinely expose the rubber parts to fuels, oil and other degrading environmental materials.

Continuous processes for polymerizing NBR are also known. Two aspects of one such method are described in U.S. Pat. Nos. 3,600,349 and 3,730,928. Those patents disclose a method of controlling the rate of polymerization in a continuous process, to achieve a more uniform conversion level at a predetermined end point. Among the copolymers that may be produced by that method is NBR. However, the method disclosed in those patents does not yield a copolymer of acrylonitrile and butadiene having the distribution of monomers necessary to achieve the desirable tensile strength and environmental resistance properties described above.

Continuous processes are also known for recovering NBR from latex, but a traditional recovery process is not adequate for the recovery of NBR containing high bound acrylonitrile. The thermoplastic behavior of the rubber causes irreversible agglomeration during the drying step, and this agglomeration inhibits the continuous flow of rubber through the process. An improved recovery process is necessary to prevent rubber agglomeration.

Thus, conventional methods of producing NBR, i.e., a batch process with a single or multiple increment monomer charge or a continuous process with a single monomer charge, do not produce a high acrylonitrile (about fifty percent) NBR with composition and distribution of acrylonitrile that gives the desired resistance to fuels, oils and other materials or the desired mechanical properties. Moreover, it is undesirable to produce or recover these copolymers by a conventional batch or continuous process. These and other problems are overcome by the process described herein.

SUMMARY OF THE INVENTION

It is thus an object of the invention to provide a continuous process for the polymerization and recovery of NBR having a high content of bound acrylonitrile.

It is a further object of the invention to provide such a process to produce NBR having superior resistance to fuels, oils and other materials.

It is still a further object of the invention to provide such a process to produce NBR having superior mechanical properties.

Other objects, advantages and novel features of the present invention will become apparent upon reading the specification herein.

The present invention relates to a continuous process for polymerizing and recovering nitrile butadiene rubber. A plurality of reaction vessels for copolymerizing acrylonitrile and butadiene monomers, including a first and last reaction vessel, is provided. A quantity of acrylonitrile monomer effective to produce a selected copolymer composition is continuously charged to the first reaction vessel, along with a quantity of butadiene monomer which is about one-sixth to about one-third the quantity of acrylonitrile charged, and effective quantities of a polymerization initiator, water and at least one emulsifying agent. The monomers in the first reaction vessel are then copolymerized to a desired steady-state conversion ratio.

The resulting mixture of copolymer, monomer and other materials is continuously transferred to a second reaction vessel, where a second quantity of butadiene monomer effective to maintain a ratio of unconverted monomers in the range of about 70 to 90 parts acrylonitrile to about 30 to 10 parts butadiene is continuously charged. The steps of copolymerizing, transferring and adding butadiene are continued until the total quantity of butadiene added is equal to the amount necessary to obtain the desired conversion of monomer to copolymer in the latex.

The resulting copolymer latex is continuously blended with at least one antioxidant and transferred sequentially to coagulation and washing vessels with sufficient agitation to prevent agglomeration of the copolymer. Recovered, wet crumb is continuously fed into a final dewatering device, pelletized, coated with a partitioning agent, transferred to a continuous belt dryer and then baled. The amount of partitioning agent and pressure are adjusted to form a friable bale. This process, including the composition of the partitioning agent, is disclosed more completely in co-pending and co-owned U.S. patent application Ser. No. 07/435,198, filed Nov. 9, 1989, issued as U.S. Pat. No. 5,098,635, which is incorporated by reference herein.

DETAILED DESCRIPTION OF THE INVENTION

An improved continuous process for polymerizing and recovering NBR having a high bound content of acrylonitrile is provided. The polymerization process of the present invention utilizes a plurality of reaction vessels in series for the copolymerization of acrylonitrile and butadiene monomer components of the NBR. Such reaction vessels are known in the art and are like those used in other continuous polymerization processes. The continuous recovery process of the present invention utilizes coagulation, washing, dewatering, drying and baling equipment like that used in other continuous recovery processes with the addition of a partitioning agent. The partitioning agent permits continuous drying of high bound acrylonitrile NBR without agglomeration of the crumb. The partitioning agent also permits formation of a friable bale for improved processing.

In the process of the present invention, the desired composition of copolymer is selected such that the amounts of acrylonitrile and butadiene monomers necessary to obtain that composition may be determined. This determination may be made empirically, or obtained from reference sources known in the art and described above (e.g., Table I). To achieve NBR having the desired characteristics described above, a composition containing about fifty percent by weight acrylonitrile is preferred, with compositions having from about forty-five percent to about fifty-five percent by weight acrylonitrile being efficacious. For example, for a copolymer in which an acrylonitrile content of forty-nine percent by weight is desired, it has been determined that the amounts of monomer charged are seventy-five percent by weight acrylonitrile and twenty-five percent by weight butadiene.

After determining the amount of each monomer necessary to obtain the desired composition, the reagents are then continuously metered into a first reaction vessel. The reagents include all of the acrylonitrile monomer and a fraction of the butadiene monomer needed to achieve the desired monomer ratio and copolymer composition in the first reaction vessel, an emulsifying agent and a polymerization initiator. Useful emulsifying agents include, for example, mixed acid soaps containing fatty and rosin acids, alkyl sulfonate soaps and soaps of oligomeric naphthalene sulfonates. Other emulsifying agents may also be used in the process according to the present invention. Polymerization initiators include both thermal initiators, e.g., potassium persulfate, dialkyl peroxides or azo compounds, and redox type initiators, e.g., an alkyl hydroperoxide with chelated ferrous sulfate and a suitable reducing agent. Possible organic hydroperoxides include diisopropyl benzene, para-menthane and pinane hydroperoxides; sodium formaldehyde sulfoxylate is a suitable reducing agent. Other reagents, described below, may also optionally be charged in the first reaction vessel.

The quantity (by parts) of butadiene monomer charged in the first reaction vessel is preferably about one-quarter the quantity of acrylonitrile monomer used, plus or minus ten percent (by parts) butadiene. Thus, in the initial mixture, the ratio (by parts) of acrylonitrile to butadiene should be 80:20±10 percent.

The monomers and other reagents continuously charged to the first reaction vessel undergo free-radical, emulsion polymerization to form a latex. The rate of reaction in the first vessel is controlled primarily by initiator concentration and temperature to give a steady-state, partial conversion of monomers to copolymer. Monomer composition also controls reaction rate and conversion to a small degree at acrylonitrile/butadiene monomer ratios of 50/50 to 90/10 because of the ten-fold larger reactivity ratio of butadiene monomer. Reaction rate becomes highly dependent on monomer composition and decreases rapidly as the butadiene charge is consumed and as the acrylonitrile/butadiene ratio increases beyond 90/10. However, in the target range of monomer ratios (for example, 70/30 to 90/10 acrylonitrile/butadiene) rate control is not dominated by monomer ratio. Other factors such as emulsifier type and level, or the type of organic hydroperoxide, also influence rate and conversion as is known to those practicing the art. These factors are normally kept constant so they do not influence rate control.

In the process of the present invention, the remaining amount of butadiene necessary to obtain the desired conversion and composition of copolymer is continuously added to the latex in the second and subsequent reaction vessels. The quantity of butadiene monomer charged in each vessel is sufficient to maintain the ratio of acrylonitrile monomer to butadiene monomer present in each vessel at a steady-state, target ratio in the range of 80:20±10 per-cent. It has been determined that at least two, and more preferably, three reaction vessels are employed to obtain the desirable properties according to the present invention, and that, most preferably, five reaction vessels are employed to obtain a co-polymer of consistent composition and component distribution. An illustration of a five-vessel sequence of butadiene increments at a constant ratio of 85/15 acrylonitrile/butadiene (AN/BD) is shown in Table II.

TABLE II

| | REACTOR COMPOSITION (Parts) | | | | | | | | |
|---|---|---|---|---|---|---|---|---|---|
| REACTOR | INCREMENT FEED | | TOTAL FEED | | EXIT OR INTERNAL | | AN FEED | AN EXIT | CONVERSION |
| NO. | AN | BD | AN | BD | AN | BD | (%) | (%) | (%) |
| 1 | 57.6 | 16.75 | 57.6 | 16.75 | 49.6 | 8.8 | 77.5 | 85.0 | 16 |
| 2 | 0 | 6.59 | 49.6 | 15.34 | 41.6 | 7.3 | 76.4 | 85.0 | 16 |
| 3 | 0 | 6.59 | 41.6 | 13.93 | 33.6 | 5.9 | 74.9 | 85.0 | 16 |
| 4 | 0 | 6.59 | 33.6 | 12.52 | 25.6 | 4.5 | 72.9 | 85.0 | 16 |
| 5 | 0 | 6.59 | 25.6 | 11.11 | 17.6 | 3.1 | 69.7. | 85.0 | 16 |
| SUM | 57.6 | 43.11 | | | | | | | |

The incrementally added quantities of butadiene may be of equal or different amounts, with the limitation that the 80:20 monomer ratio is maintained in each reaction vessel. No significant difference has been observed in the properties of the final copolymer when the additional increments occur in equal or different quantities. The total quantity of butadiene monomer added does not exceed the amount necessary to achieve the desired conversion and composition of the final copolymer.

After the final increment of butadiene has been added to the latex in the final reaction vessel, and polymerization has proceeded to the final desired conversion, a shortstopping agent such as sodium dimethyldithiocarbamate is added to terminate the polymerization reaction. It has been determined that when the total conversion of monomer to copolymer exceeds about 90 percent, the processability of the resulting polymer decreases due to increased viscosity. The solubility of the polymer in methyl ethyl ketone also decreases indicating increased gel formation, i.e., crosslinking. It is therefore preferable to add the shortstopping agent when the conversion of monomer to copolymer is not greater than 90 percent. At the same time, it is desirable to obtain conversions of at least about 75 percent to avoid unnecessary removal of excess monomer.

After completion of the copolymerization, the resulting latex is removed, and unreacted monomer and other volatile reagents are removed by vacuum distillation as is known in the art. The stripped latex is continuously blended with at least one antioxidant and transferred to coagulation and washing vessels with sufficient agitation to prevent agglomeration of the copolymer. Acid-assisted alum coagulation at a pH of 3±0.5 with 3–4 parts aluminum sulfate (alum) per hundred parts rubber (phr), is preferred to obtain the best control of crumb size and tack. Tack control is needed to minimize agglomeration of the polymer crumb during washing. Coagulation can also be done with acid alone or other salts such as calcium chloride. However, these other processes are less preferred due to increased tack and agglomeration of the polymer crumb.

Recovered, wet crumb is continuously fed into an extruder-type dewatering device, pelletized, coated with a partitioning agent and transferred to a continuous belt dryer. The amount of partitioning agent is adjusted to form a friable bale which has sufficient integrity for shipping and handling but which readily breaks down for compounding.

The NBR produced by the method according to the present invention exhibits superior resistance and strength properties. The superiority achieved by the present invention over NBR made according to conventional methods is illustrated by the following Examples and summarized in Table V, discussed more completely below. All Examples are made from the reagents and quantities enumerated in Table III, and the processing parameters for each example are summarized in Table IV below.

TABLE III (Typical Reagent and Quantities for NBR Containing 50 Percent Bound Acrylonitrile)

| Reagent | Quantity (in parts per hundred monomer) |
|---|---|
| Water | 200 |
| Electrolyte (KCl) | 0–0.3 |
| Redox Pigment (sodium poly-naphthalene-sulfonate, EDTA) | 0.15–0.20 |
| $FeSO_4 \times 7H_2O$ | 0.002–0.008 |
| Mixed Sodium Soap Rosin and Fatty Acids and Oligomeric Naphthalene Sulfonate | 4.5 |
| Mercaptan | 0.6–0.9 |
| Acrylonitrile | See Table IV |
| Butadiene | See Table IV |
| Organic Hydroperoxide (pinane hydroperoxide) | 0.05 |
| Shortstopping agent (sodium diethyl-dithiocarbamate) | 0.20–0.22 |

Polymerization was performed in each Example at 10° C.

TABLE IV (Examples of Monomer Charged)

| Example No. | Process | AN Charged (parts) | Parts Butadiene Charged/Percent Conversion At Addition of Butadiene Reaction Vessel or Addition Step | | | | | Bound AN (Percent) | Final Conversion (Percent) | Maximum % Conversion per 100 Monomer |
|---|---|---|---|---|---|---|---|---|---|---|
| | | | 1 | 2 | 3 | 4 | 5 | | | |
| 1 | Batch | 54 | 21/0 | — | — | — | — | 59.5 | 50.2 | 75 |
| 2 | Batch | 54 | 21/0 | 16/35 | — | — | — | 52.6 | 73.3 | 91 |
| 3 | Batch | 54 | 21/0 | 16/35 | — | — | — | 54.9 | 73.6 | 91 |
| 4 | Batch | 54 | 21/0 | 16/35 | 9/65 | — | — | 50.5 | 85.2 | 100 |
| 5 | Batch | 56 | 22/0 | 8/32 | 7/52 | 6/72 | — | 50.2 | 81.9 | 99 |
| 6 | Batch | 56 | 22/0 | 8/32 | 7/52 | 6/72 | — | 50.6 | 86.8 | 99 |
| 7 | Continuous | 56 | 20/24 | 6/40 | 6/56 | 6/72 | 6/82 | 48.8 | 82.0 | 100 |

EXAMPLE I

In this Example, a conventional batch process was employed using the quantities of reagents specified in Table II. A single quantity of 21 parts butadiene monomer was added to the batch reactor with 54 parts acrylonitrile monomer. This amount of butadiene was sufficient to reach 50.2 percent conversion, about 2.4 times the parts of butadiene charged, rather than the maximum conversion based on 75 parts per hundred total monomer. Shortstop was added after all the butadiene was consumed and copolymerization stopped. The resulting polymer contained 59.5 percent by weight bound acrylonitrile. This example shows that a conventional batch process can produce high bound acrylonitrile with the limitations of low monomer conversion (67 percent of the monomer charged) and widely varying monomer ratio.

EXAMPLE II

In this Example, a batch process was employed in which 37 parts butadiene monomer were added to 54 parts acrylonitrile monomer in two increments. Initially, 21 parts butadiene monomer were charged to the batch reactor with the entire quantity of acrylonitrile monomer. Upon conversion of 35 percent of the total monomer to copolymer, an additional 16 parts butadiene monomer were added. The combined amount of butadiene was sufficient to reach 73.3 percent conversion, about 2 times the parts of butadiene charged, rather than the maximum conversion based on 91 parts per hundred total monomer. Shortstop was added after all the butadiene was consumed and copolymerization stopped. The resulting polymer contained 52.6 percent by weight bound acrylonitrile. This example shows that a two-increment batch process with a limited amount of butadiene can produce high bound acrylonitrile with improved monomer conversion, 81 percent of the monomer charged. However, the monomer ratio still varies widely due to the complete consumption of butadiene with an excess of acrylonitrile.

EXAMPLE III

Acrylonitrile and butadiene were charged as in Example II, and polymerization was allowed to proceed to a maximum conversion of 73.6 percent before shortstop was added. A bound acrylonitrile content of 54.9 percent in the copolymer was obtained.

EXAMPLE IV

A batch process was employed in which 46 parts of butadiene were added to 54 parts acrylonitrile in three increments. Initially, 21 parts butadiene monomer were charged to the batch reactor with the entire quantity of acrylonitrile monomer. Upon conversion of 35 percent total monomer to copolymer, an additional 16 parts butadiene monomer were added to the batch reactor. Subsequently, when 65 percent of the total monomer had been converted, an additional 9 parts butadiene monomer were added to the batch reactor. The reaction was shortstopped at 85.2 percent conversion before all butadiene was consumed and copolymerization stopped. The bound acrylonitrile content of the copolymer was 50.5 percent. This example shows that three increments of butadiene are preferred to two increments to achieve high bound acrylonitrile at high conversion of monomer without depletion of butadiene.

EXAMPLE V

In this Example, 56 parts acrylonitrile were charged with a total of 43 parts butadiene monomer, added in four increments. The initial butadiene charge consisted of 22 parts, and upon conversion of 32 percent of the total monomer, an additional 8 parts butadiene monomer were added. Subsequently, at conversions of 52 and 72 percent of the total monomer, an additional 7 and 6 parts butadiene monomer were added. Polymerization was shortstopped at a final conversion of 81.9 percent. The bound acrylonitrile content resulting from this conversion was 50.2 percent.

EXAMPLE VI

Acrylonitrile and butadiene were charged and polymerized as in Example V. A final conversion of 86.8 percent of total monomer resulted in a bound acrylonitrile content of 50.6 percent.

EXAMPLE VII

In a continuous process with 5 reaction vessels, 56 parts acrylonitrile and 20 parts butadiene were continuously charged in a first reaction vessel. A steady-state conversion of 24 percent was maintained in the first vessel. An additional 6 parts butadiene were continuously charged to a second reaction vessel in which a steady-state conversion of 40 percent was maintained. A third increment of 6 parts butadiene was continuously charged to a third reaction vessel in which a steady-state conversion of 56 percent was maintained. Fourth and fifth increments of 6 parts butadiene were continuously charged to fourth and fifth reaction vessels in which steady-state conversions of 72 and 82 percent were maintained. The latex was shortstopped at 82 percent conversion as it exited the final reactor. The bound acrylonitrile content was 48.8%.

As summarized in Table V, the tensile strength and environmental resistance properties resultant in the continuously produced NBR are substantially superior to those found in batch processed NBR. In Batch Process 1, three increments of butadiene monomer were charged to a single reactor, with second and third charges added after a target conversion was attained. Batch Process 2 represents a commercial product also employing a batch process and believed to employ incremental additions of butadiene monomer. Continuous Process represents the continuous process of NBR copolymerization of the present invention.

Many of the advantages of the method according to the present invention are illustrated by the data in Table V. For example, the continuous process NBR has a substantially higher tensile strength and elastic modulus than either of the batch processed copolymers. Similarly, the reduction in tensile strength resulting from immersion in fuels is in most cases substantially reduced for the continuous process NBR as compared to those for batch processed NBR. Swelling associated with this fuel exposure is also reduced for the continuous process NBR, and fuel permeation is considerably reduced.

TABLE V

| POLYMER TYPE | BATCH PROCESS 1 | BATCH PROCESS 2 | CONTINUOUS PROCESS |
|---|---|---|---|
| FINAL POLYMER PROPERTIES | | | |
| Bound AN (% w/w) | 46 | 47 | 47.2 |
| Raw Mooney Viscosity | —[1] | 45 | 48 |
| $M_n/1000$ | — | 66.3 | 57.5 |
| $M_w/1000$ | — | 312 | 273 |

TABLE V-continued

| POLYMER TYPE | BATCH PROCESS 1 | BATCH PROCESS 2 | CONTINUOUS PROCESS |
|---|---|---|---|
| M.W.D. | — | 4.71 | 4.75 |
| $M_z/10^6$ | — | 12.4 | 2.66 |
| $M_{z+1}/10^6$ | — | 60.2 | 15.5 |
| CMPD Mooney Viscosity | 58 | 49 | 70 |
| MOONEY SCORCH (at 270° F.) | | | |
| Min to 5 Pt rise | 9.6 | 10.8 | 10.6 |
| Min Reading | 20 | 15 | 23 |
| RHEOGRAPH PROPERTIES (Model OPR, 325° F., 30 minutes) | | | |
| Min Torque (in-lb) | 5.9 | 3.7 | 5.7 |
| Max Torque (in-lb) | 81.3 | 79.0 | 99.3 |
| T2, (min) | 1.94 | 1.95 | 2.09 |
| T90, (min) | 6.29 | 4.77 | 7.70 |
| Cure Rate (in-lb/min) | 15.0 | 23.2 | 14.6 |
| PRESS CURE (at 325° F.) | | | |
| Tensile strength (psi) | | | |
| at 15 min | 1995 | 1859 | 2174 |
| at 25 min | 1952 | 1910 | 2271 |
| Elongation (percent) | | | |
| at 15 min | 394 | 384 | 392 |
| at 25 min | 387 | 383 | 385 |
| Modulus (100 percent) | | | |
| at 15 min | 717 | 585 | 750 |
| at 25 min | 733 | 624 | 795 |
| Modulus (300 percent) | | | |
| at 15 min | 1546 | 1348 | 1661 |
| at 25 min | 1545 | 1408 | 1762 |
| FREON PERMEATION (lb/ft/yr, ½" hose) | 1.03 | 1.19 | 0.62 |
| FUEL EXPOSURE | | | |
| After immersion in Gasohol (80/20 Gasoline/Methanol, 70 hrs at room temp) | | | |
| Change in tensile strength (percent) | −59.6 | −62.7 | −60.8 |
| Change in Elongation (percent) | −36.6 | −25.9 | −29.6 |
| Volume Change (percent) | 40.5 | 33.8 | 33.4 |
| After immersion in Sour Gasoline (70 hrs at room temp) | | | |
| Change in tensile strength (percent) | −43.0 | −51.8 | −44.6 |
| Change in Elongation (percent) | −20.9 | −18.5 | −11.9 |
| Volume Change (percent) | 28.6 | 23.8 | 25.9 |
| After immersion in Fuel B (70 hrs at room temp) | | | |
| Change in tensile strength (percent) | −28.3 | −40.3 | −25.0 |
| Change in Elongation (percent) | −10.4 | −18.0 | −8.7 |
| Volume Change (percent) | 16.5 | 16.1 | 9.6 |
| After immersion in Fuel C (70 hrs at room temp) | | | |
| Change in tensile strength (percent) | −44.9 | −51.8 | −39.8 |
| Change in Elongation (percent) | −24.7 | −24.7 | −12.1 |
| Volume Change (percent) | 30.8 | 24.1 | 24.9 |
| PERMEATION BY FUEL C (g/m/day) | 82.8 | 55.1 | 46.7 |
| OIL EXPOSURE (70 hrs at 212° F.) | | | |
| After immersion in No. 1 Oil | | | |
| Change in tensile strength (percent) | 22.2 | −4.5 | −1.6 |
| Change in Elongation (percent) | −20.4 | −24.9 | −24.5 |
| Volume Change (percent) | −5.1 | −4.2 | −5.1 |

TABLE V-continued

| POLYMER TYPE | BATCH PROCESS 1 | BATCH PROCESS 2 | CONTINUOUS PROCESS |
|---|---|---|---|
| After immersion in No. 3 Oil | | | |
| Change in tensile strength (percent) | 6.3 | 0.2 | −0.3 |
| Change in Elongation (percent) | −23.4 | −16.8 | −20.4 |
| Volume Change (percent) | −0.4 | 0.7 | −2.1 |
| OVEN AGING (70 hrs) | | | |
| at 257° F. | | | |
| Change in tensile strength (percent) | 13.5 | 7.8 | 7.0 |
| Change in Elongation (percent) | −31.6 | −30.4 | −38.0 |
| at 300° F. | | | |
| Change in tensile strength (percent) | 3.8 | −3.8 | −7.5 |
| Change in Elongation (percent) | −70.7 | −58.0 | −79.5 |
| LOW TEMPERATURE RETRACTION Temperature of 0 percent retraction | −10.9 | −7.7 | −7.2 |

"—" indicates that data was not available

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A continuous process for polymerizing acrylonitrile and butadiene monomers to produce substantially consistent composition and component distribution NBR rubbers having a bound acrylonitrile content of about fifty percent by weight comprising the steps of:

continuously charging quantities of acrylonitrile monomer and butadiene monomer in a ratio of about 80 parts acrylonitrile to 20 parts±10% butadiene and quantities of at least one polymerization initiator, water and at least one emulsifying agent to a first reaction vessel in amounts effective to produce a latex;

continuously copolymerizing the acrylonitrile and butadiene monomers in the first reaction vessel to achieve and maintain a ratio of unconverted monomers in the range of about 70 to 90 parts acrylonitrile to about 30 to 10 parts butadiene;

continuously transferring the copolymerized acrylonitrile and butadiene, acrylonitrile monomer, butadiene monomer, polymerization initiator, water and emulsifying agent from the first reaction vessel to a second reaction vessel;

continuously charging additional monomer consisting essentially of butadiene to the second reaction vessel effective to maintain a ration of unconverted monomers in the range of about 70 to 90 parts acrylonitrile to about 30 to 10 parts butadiene; and continuing the steps of copolymerizing, transferring and adding butadiene until the total quantity of butadiene added is equal to the amount necessary to obtain monomer conversion of about 75% to 90% and final copolymer composition of about 50% acrylonitrile in a last reaction vessel.

2. The continuous process of claim 1, wherein the quantity of butadiene monomer charged to the first reaction vessel is about one-fourth the quantity of acrylonitrile monomer charged.

3. The continuous process of claim 1, wherein the polymerization initiator is a redox initiator.

4. The continuous process of claim 1, wherein the polymerization initiator is a thermal initiator.

5. The continuous process of claim 1, wherein the emulsifying agent is an anionic emulsifier.

6. The continuous process of claim 1, further comprising the step of adding a shortstopping agent to terminate polymerization in the last reaction vessel.

7. The continuous process of claim 1, wherein the shortstopping agent is added at a conversion of not greater than 90 parts of total monomer.

8. The continuous process of claim 1, wherein the shortstopping agent is sodium dimethyldithiocarbamate or diethyl hydroxyl amine or a mixture of the two.

9. The continuous process of claim 1 including the steps of recovering the nitrile butadiene rubber produced by coagulating the polymer latex with aqueous solutions of acid or salt to give processable polymer crumb.

10. The continuous process of claim 9 in which the coagulation serum has a pH of 3 and contains 3 parts per hundred rubber of aluminum sulfate.

11. The continuous process of claim 9 in which calcium chloride is the coagulation salt.

12. The continuous process of claim 9 including the further steps of dewatering, pelletizing and partitioning the polymer.

* * * * *